(12) United States Patent
Jackson et al.

(10) Patent No.: US 8,527,438 B2
(45) Date of Patent: Sep. 3, 2013

(54) PRODUCING SPIKE-TIMING DEPENDENT PLASTICITY IN AN ULTRA-DENSE SYNAPSE CROSS-BAR ARRAY

(75) Inventors: Bryan Lawrence Jackson, San Jose, CA (US); Dharmendra Shantilal Modha, San Jose, CA (US); Bipin Rajendran, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 12/645,479

(22) Filed: Dec. 22, 2009

(65) Prior Publication Data
US 2011/0153533 A1  Jun. 23, 2011

(51) Int. Cl.
G06E 1/00 (2006.01)
G06E 3/00 (2006.01)
G06F 15/18 (2006.01)
G06G 7/00 (2006.01)

(52) U.S. Cl.
USPC ......................................................... 706/17

(58) Field of Classification Search
USPC ......................................................... 706/17
See application file for complete search history.

(56) References Cited

U.S. PATENT DOCUMENTS

| | | | |
|---|---|---|---|
| 5,216,752 A | 6/1993 | Tam | |
| 5,422,982 A | 6/1995 | Pernisz | |
| 5,619,617 A * | 4/1997 | Furuta et al. | 706/25 |
| 6,940,740 B2 | 9/2005 | Ueda et al. | |
| 6,956,280 B2 | 10/2005 | Tajiri et al. | |
| 6,999,953 B2 | 2/2006 | Ovhsinsky | |
| 7,007,002 B2 | 2/2006 | Matsugu et al. | |
| 7,392,230 B2 * | 6/2008 | Nugent | 706/15 |
| 7,409,375 B2 | 8/2008 | Nugent | |
| 7,525,833 B2 | 4/2009 | Snider et al. | |
| 7,599,895 B2 * | 10/2009 | Nugent | 706/14 |
| 2008/0162391 A1 | 7/2008 | Izhikevich | |
| 2008/0294580 A1 | 11/2008 | Adams et al. | |
| 2009/0043722 A1 | 2/2009 | Nugent | |
| 2011/0106742 A1 * | 5/2011 | Pino | 706/33 |

OTHER PUBLICATIONS

Exploiting Memristance for Implementing Spike-Time-Dependent-Plasticity in Neuromorphic Nanotechnology Systems B. Linares-Barranco and T. Serrano-Gotarredona Instituto de Microelectronica de Sevilla (IMSE-CNM-CSIC), Av. Americo Vespucio sin, 41092 Sevilla, Spain.*

(Continued)

*Primary Examiner* — Kakali Chaki
*Assistant Examiner* — Ababacar Seck
(74) *Attorney, Agent, or Firm* — Kenneth L. Sherman, Esq.; Michael Zarrabian, Esq.; Sherman & Zarrabian LLP

(57) ABSTRACT

Embodiments of the invention relate to producing spike-timing dependent plasticity in an ultra-dense synapse cross-bar array for neuromorphic systems. An aspect of the invention includes when an electronic neuron spikes, an alert pulse is sent from the spiking electronic neuron to each electronic neuron connected to the spiking electronic neuron. When the spiking electronic neuron sends the alert pulse, a gate pulse is sent from the spiking electronic neuron to each electronic neuron connected to the spiking electronic neuron. When each electronic neuron receives the alert pulse, a response pulse is sent from each electronic neuron receiving the alert pulse to the spiking electronic neuron. The response pulse is a function of time since a last spiking of the electronic neuron receiving the alert pulse. In addition, the combination of the gate pulse and response pulse is capable increasing or decreasing conductance of a variable state resistor.

27 Claims, 14 Drawing Sheets

(56) References Cited

OTHER PUBLICATIONS

Learning in Silicon: A Neuromorphic Model of the Hippocampus John Vernon Arthur A Dissertation in Bioengineering Presented to the Faculties of the University of Pennsylvania in Partial Fulfillment of the Requirements for the Degree of Doctor of Philosophy 2006.*

Synchrony detection for spike-mediated computation Wilson, C.S.; Hasler, P.E.; DeWeerth, S.P.; Circuits and Systems, 2000. Proceedings. ISCAS 2000 Geneva. The 2000 IEEE International Symposium on vol. 2, May 28-31, 2000 pp. 305-308 vol. 2.

A model of spike-timing dependent plasticity: one or two coincidence detectors? Karmarkar UR, Buonomano DV. J Neurophysiol. Jul. 2002;88(1):507-13.

Synchrony detection and amplification by silicon neurons with STDP synapses Bofill-i-Petit, A.; Murray, A.F.; Neural Networks, IEEE Transactions on vol. 15, Issue 5, Sep. 2004 pp. 1296-1304.

Point-to-point connectivity between neuromorphic chips using address events Boahen, K.A.; Circuits and Systems II: Analog and Digital Signal Processing, IEEE Transactions on vol. 47, Issue 5, May 2000 pp. 416-434.

http://citeseerx.ist.psu.edu/viewdoc/summary?doi=10.1.1.45.7674 A Pulse-Coded Communications Infrastructure for Neuromorphic Systems Stephen R. Deiss, Rodney J. Douglas and Adrian M. Whatley year = 1998.

http://citeseerx.ist.psu.edu/viewdoc/summary?doi=10.1.1.36.3015 The Electrotonic Transformation: a Tool for Relating Neuronal Form to Function Nicholas Carnevale, Kenneth Y. Tsai , Brenda J. Claiborne , Thomas H. Brown Leen (Eds.), Advances in Neural Information Processing Systems booktitle = {Leen (Eds.), Advances in Neural Information Processing Systems}, year = {1995}, pp. 69-76, publisher = {MIT Press}.

Likharev, "Hybrid CMOS/Nanoelectronic Circuits: Opportunities and Challenges", Journal of Nanoelectronics and Optoelectronics, vol. 3, p. 202-230,2008.

D. H. Kang et al., "Novel Heat Dissipating Cell Scheme for Improving a Reset Distribution in a 512M Phase-Change Random Access Memory (PRAM)", 2007 Symposium on VLSI Technology.

D.B. Strukov et al., "CMOL FGPS: a reconfigurable architecture for hybrid digital circuits with two-terminal nanodevices", 2005 Nanotechnology 16, p. 888-900.

* cited by examiner

PRODUCING SPIKE-TIMING DEPENDENT PLASTICITY IN AN ULTRA-DENSE SYNAPSE CROSS-BAR ARRAY

This invention was made with Government support under HR0011-09-C-0002 awarded by Defense Advanced Research Projects Agency (DARPA). The Government has certain rights in this invention.

BACKGROUND

1. Field of the Invention

The present invention relates to neuromorphic systems, and in particular, producing spike-timing dependent plasticity in an ultra-dense synapse cross-bar array.

2. Background of the Invention

Neuromorphic systems, also referred to as artificial neural networks, are computational systems that permit electronic systems to essentially function in a manner analogous to that of biological brains. Neuromorphic systems do not generally utilize the traditional digital model of manipulating 0s and 1s. Instead, neuromorphic systems create connections between processing elements that are roughly functionally equivalent to neurons of a biological brain. Neuromorphic systems may be comprised of various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed. Furthermore, the change depends on the precise delay between the two events, such that the more the delay, the less the magnitude of change.

BRIEF SUMMARY

Embodiments of the invention relate to producing spike-timing dependent plasticity in an ultra-dense synapse cross-bar array for neuromorphic systems. An aspect of the invention includes a method for producing spike-timing dependent plasticity. The method includes when an electronic neuron spikes, an alert pulse is sent from the spiking electronic neuron to each electronic neuron connected to the spiking electronic neuron. When the spiking electronic neuron sends the alert pulse, a gate pulse is sent from the spiking electronic neuron to each electronic neuron connected to the spiking electronic neuron. When each electronic neuron receives the alert pulse, a response pulse is sent from each electronic neuron receiving the alert pulse to the spiking electronic neuron. The response pulse is a function of time since a last spiking of the electronic neuron receiving the alert pulse. In addition, the combination of the gate pulse and response pulse is capable increasing or decreasing conductance of a variable state resistor.

Another aspect of the invention includes a system for producing spike-timing dependent plasticity. The system includes a plurality of electronic neurons, wherein each electronic neuron is configured to send an alert pulse to each connected electronic neuron when the electronic neuron spikes. Each electronic neuron is also configured to send a gate pulse from the spiking neuron to each connected electronic neuron when the spiking electronic neuron sends the alert pulse. The electronic neuron is also configured to send a response pulse from each electronic neuron receiving the alert pulse to the spiking electronic neuron. The system further includes a cross-bar array coupled to the plurality of electronic neurons and configured to interconnect the plurality of electronic neurons. The cross-bar array includes a plurality of variable state resistors, wherein each variable state resistor is at a cross-point junction, the cross-point junction is coupled between two electronic neurons, and each variable state resistor is configured to increase or decrease conductance as a function of time since a last spiking of the electronic neuron receiving the alert pulse.

Another aspect of the invention includes a method for tracking time elapsed since a previous spiking event within an electronic neuron. The method includes maintaining at least one internal variable for an electronic neuron, wherein the internal variable has a value which varies from an initial state defined at a time of a last firing of the electronic neuron to a value that is a function of time.

DETAILED DESCRIPTION

Embodiments of the invention provide neuromorphic systems, including ultra-dense synapse cross-bar arrays which implement spike-timing dependent plasticity (STDP). Embodiments include analog variable state resistor amplitude modulated STDP versions and binary variable state resistor probability modulated STDP versions. Disclosed embodiments include systems with access devices and systems without access devices. These embodiments exhibit significantly improved update rates in the tens of Gigahertz range.

Figure 1:
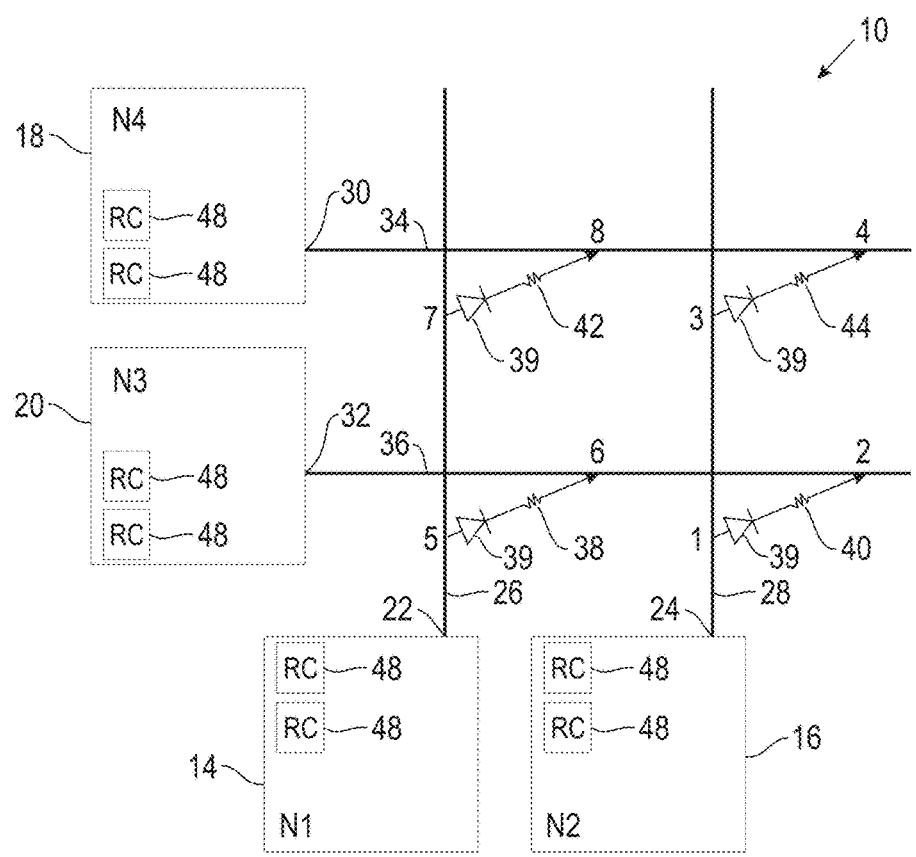
FIG. 1 shows a diagram of a neuromorphic system having an ultra-dense cross-bar array in accordance with an embodiment of the invention.

Referring now to FIG. 1, there is shown a diagram of a neuromorphic system having an ultra-dense cross-bar array in accordance with an embodiment of the invention. The term "ultra-dense cross-bar array" as used herein refers to cross-bar arrays that may have a pitch in the range of about 0.1 nm to 10 µm. The neuromorphic system 10 includes a cross-bar array 12 having a plurality of neurons 14, 16, 18 and 20. These neurons are also referred to herein as "electronic neurons". Neurons 14 and 16 are axonal neurons and neurons 18 and 20 are dendritic neurons. Axonal neurons 14 and 16 are shown with outputs 22 and 24 connected to axons 26 and 28 respectively. Dendritic neurons 18 and 20 are shown with inputs 30 and 32 connected to dendrites 34 and 36 respectively. Axonal neurons 14 and 16 also contain inputs and receive signals along dendrites, however, these inputs and dendrites are not shown for simplicity of illustration. Thus, the axonal neurons 14 and 16 will function as dendritic neurons when receiving inputs along dendritic connections. Likewise, the dendritic neurons 18 and 20 will function as axonal neurons when sending signals out along their axonal connections. When any of the neurons 14, 16, 18 and 20 fire, they will send a pulse out to their axonal and to their dendritic connections.

Each connection between axons 26, 28 and dendrites 34, 36 are made through a variable state resistor 38, 40, 42 and 44. The junctions where the variable state resistors are located may be referred to herein as "cross-point junctions". The term "variable state resistor" refers to a class of devices in which the application of an electrical pulse (either a voltage or a current) will change the electrical conductance characteristics of the device. For a general discussion of cross-bar array neuromorphic systems as well as to variable state resistors as used in such cross-bar arrays, reference is made to K. Likharev, "Hybrid CMOS/Nanoelectronic Circuits: Opportunities and Challenges", J. Nanoelectronics and Optoelectronics. 2008, Vol. 3, p. 203-230, 2008, which is hereby incorporated by reference. In one embodiment of the invention, the variable state resistor may comprise a phase change memory (PCM). Besides PCM devices, other variable state resistor devices that may be used in embodiments of the invention include devices made using metal oxides, sulphides, silicon oxide and amorphous silicon, magnetic tunnel junctions, floating gate FET transistors, and organic thin film layer devices, as described in more detail in the above-referenced article by K. Likharev. The variable state resistor may also be constructed using a static random access memory device. Also attached to the variable state resistors is an access device 39, which may comprise a PN diode, an FET wired as a diode, or some other element with a nonlinear voltage-current response.

Figure 2:
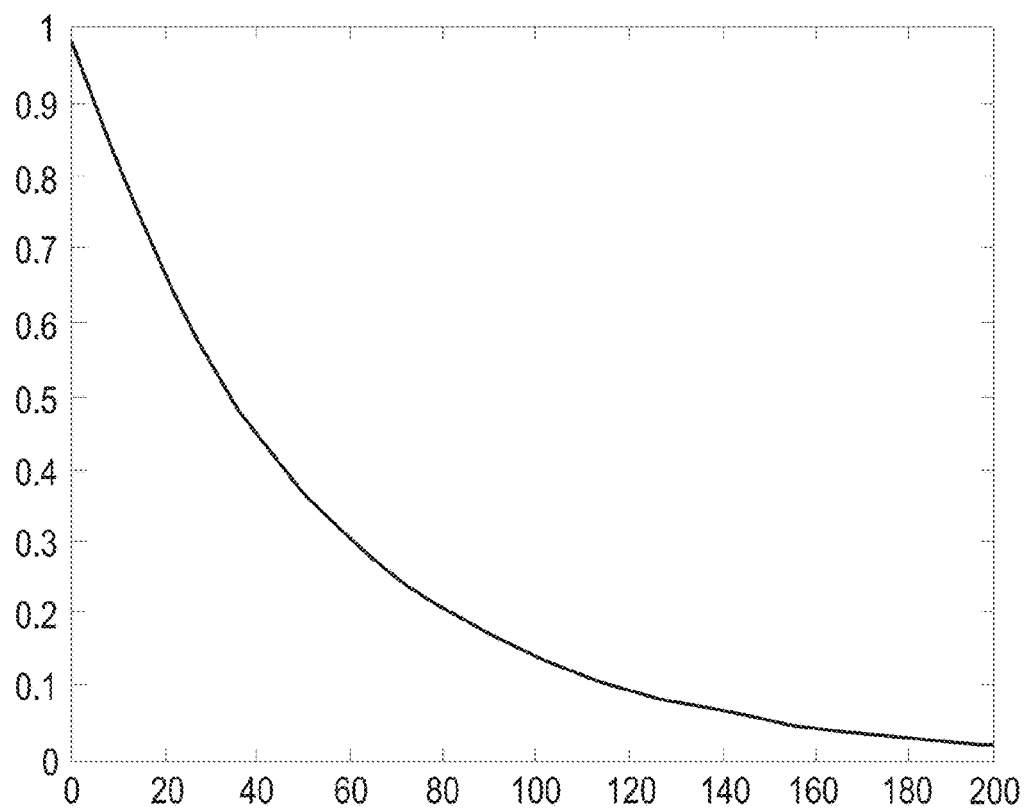
FIG. 2 shows a diagram of the voltage curve of an RC circuit used in the neuromorphic system shown in FIG. 1 in accordance with an embodiment of the invention.

Neurons 14, 16, 18 and 20 each include a pair of RC circuits 48. In general, in accordance with an embodiment of the invention, axonal neurons 14 and 16 will "fire" (transmit a pulse) when the inputs they receive from dendritic input connections (not shown) exceed a threshold. When axonal neurons 14 and 16 fire they maintain an A-STDP variable that decays with a relatively long, predetermined, time constant determined by the values of the resistor and capacitor in one of its RC circuits 48. For example, in one embodiment, this time constant may be 50 ms. The A-STDP variable may be sampled by determining the voltage across the capacitor using a current mirror, or equivalent circuit. The decay of this variable is shown in FIG. 2. This variable is used to achieve axonal STDP, by encoding the time since the last firing of the associated neuron, as discussed in more detail below. Axonal STDP is used to control "potentiation", which in this context is defined as increasing synaptic conductance When dendritic neurons 18, 20 fire they maintain a D-STDP variable that decays with a relatively long, predetermined, time constant based on the values of the resistor and capacitor in one of its RC circuits 48. For example, in one embodiment, this time constant may be 50 ms. The decay of this variable is shown in FIG. 2. In other embodiments this variable may decay as a function of time according to other functions besides the exponential curve shown in FIG. 2. For example the variable may decay according to linear, polynomial, or quadratic functions. In another embodiment of the invention, the variable may increase instead of decreasing over time. In any event, this variable may be used to achieve dendritic STDP, by encoding the time since the last firing of the associated neuron, as discussed in more detail below. Dendritic STDP is used to control "depression", which in this context is defined as decreasing synaptic conductance.

Figure 3A:
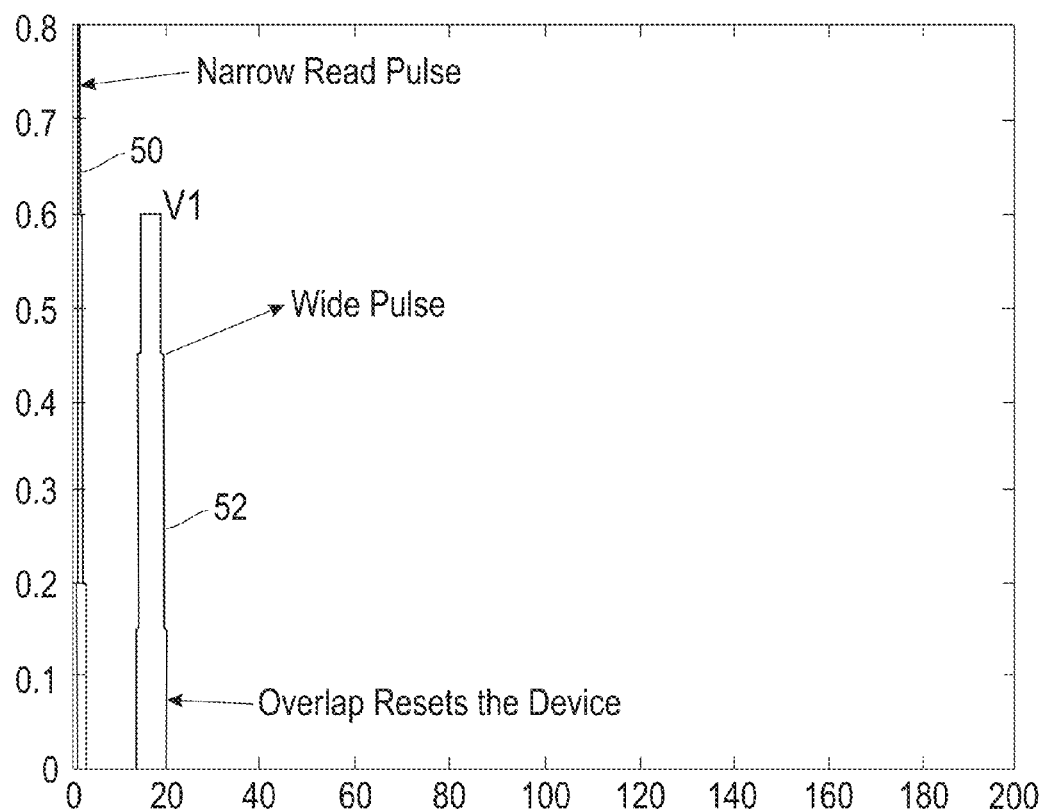
FIG. 3a shows a diagram of alert and wide reset pulses sent by a neuron in the neuromorphic system shown in FIG. 1 in accordance with an embodiment of the invention.
Figure 3B:
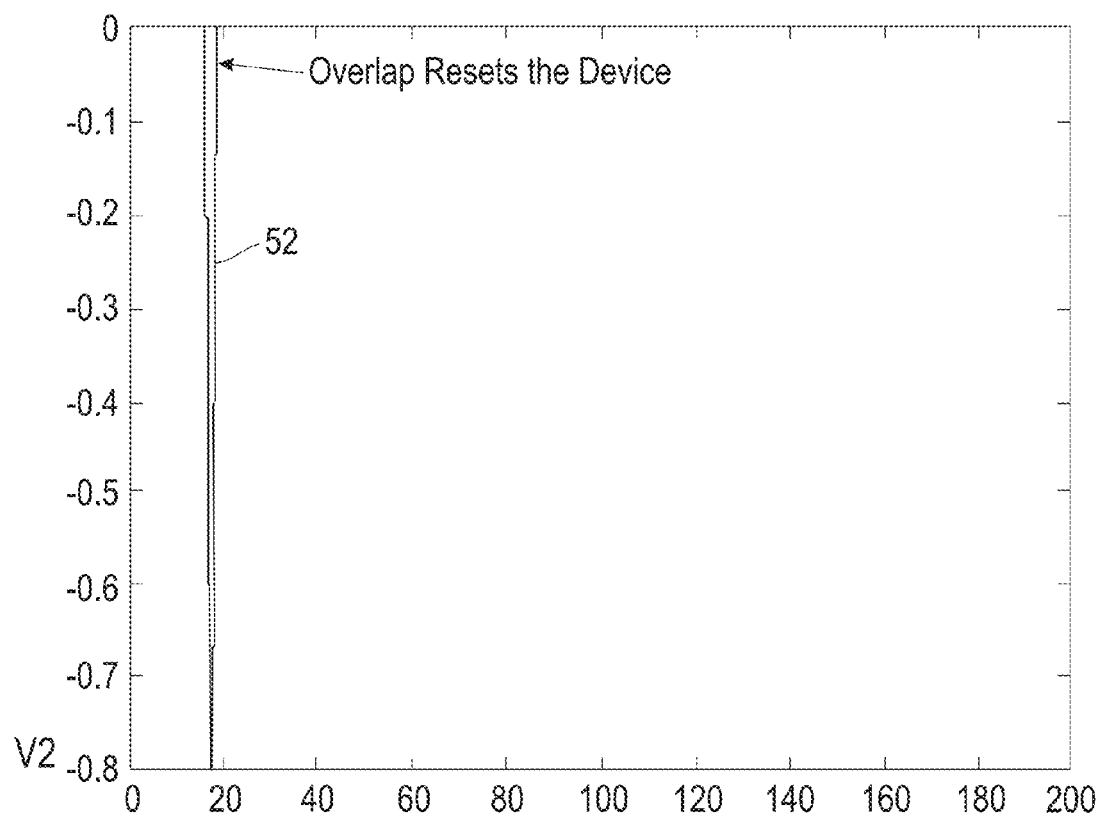
FIG. 3b shows a diagram of a rebound RESET pulse sent by a neuron in the neuromorphic system shown in FIG. 1 in accordance with an embodiment of the invention.

Referring now to FIGS. 3a and 3b, when neuron 14 fires, it may be implementing a SET or a RESET operation, which has the effect of setting (increasing conductance) or resetting (decreasing conductance) the variable state resistor 38. The system 10 will implement a SET or a RESET operation depending on whether the firing neuron fires before or after the neuron receiving a signal from the firing neuron. This is necessary to implement STDP. In particular, if the pre-synaptic neuron fires before the post synaptic neuron, the system 10 will implement a SET operation, which will have the effect of increasing synaptic conductance in the variable state resistor 38-44. If, instead, the pre-synaptic neuron fires before the post synaptic neuron, the system 10 will implement a RESET operation, which will have the effect of decreasing synaptic conductance in the variable state resistor 38-44. Each neuron determines whether to perform a SET or a RESET operation by determining Δt, the time between its last firing and the receipt of an incoming signal. If Δt is a positive number, it means that the incoming signal is received through an axonal connection and the neuron will respond by performing a SET operation, which consists of sending a SET pulse through its axon. This situation is also referred to as one in which the neuron receives a "retrograde" alert pulse. If Δt is a negative number, it means that the incoming signal is received through a dendritic connection and the neuron will respond by performing a RESET operation, which consists of sending a RESET pulse through its dendrite. This situation is also referred to as one in which the neuron receives a "forward" alert pulse.

During the RESET operation, when neuron 14 fires it sends a narrow alert pulse 50 into the axon 26. As used herein, the term "when" can mean that the alert pulse is sent instantaneously after the neuron fires, or some period of time after the neuron fires. The alert pulse 50 may be a few ns long. The alert pulse 50 is received by the downstream neurons 18, 20. Neuron 14 also updates its A-STDP variable and lets it decay. The alert pulse 50 is followed by a pause followed by a wider pulse 52, which may be about 1 μs long and have a magnitude of V1. The wider pulse 52 may also be referred to herein as a "gate" pulse. The wideness is to account for noise in delays. The alert pulse 50 is received by downstream neurons, such as neurons 18 and 20. In an asynchronous fashion, with a probability proportional to their respective D-STDP variable, neurons 18 and 20, after a pause, send narrow rebound RESET pulses of a few ns in length, and with a voltage of magnitude V2. V2 is set such that V1-V2 will reset the associated variable state resistor 38 or 42.

Figure 4A:
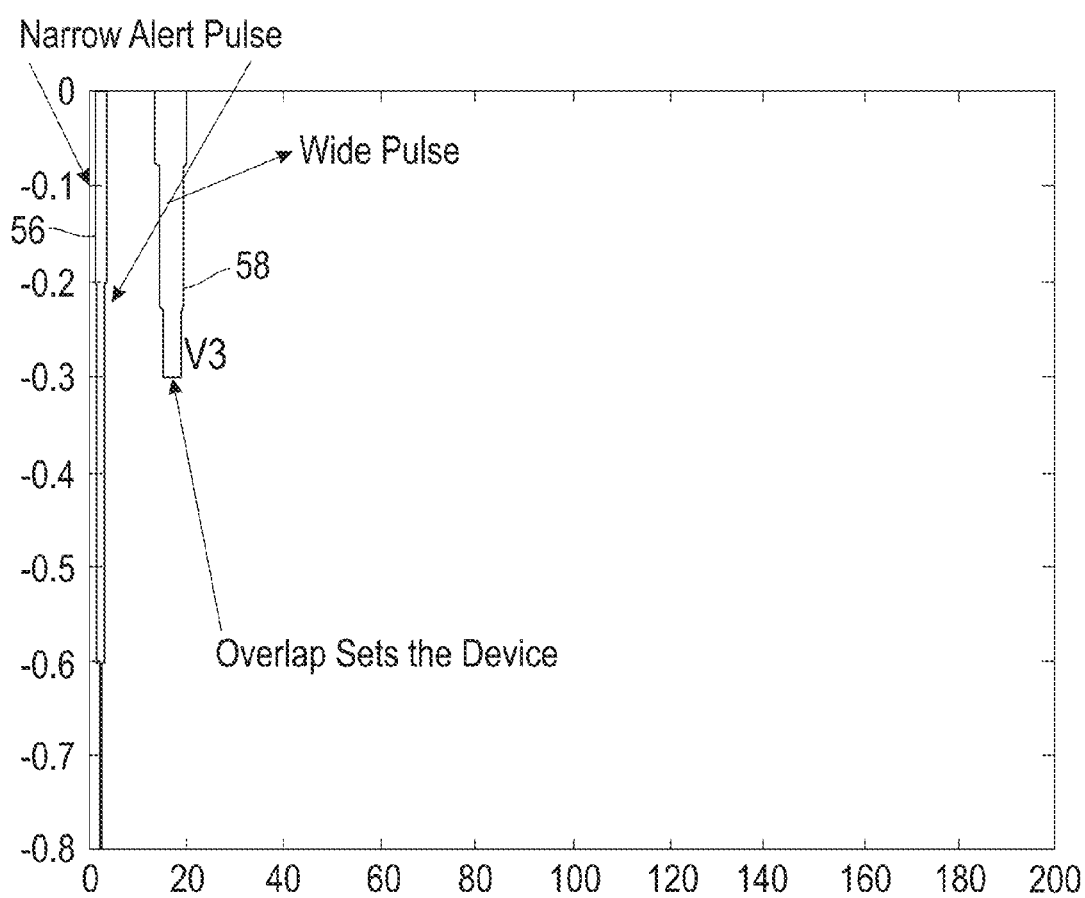
FIG. 4a shows a diagram of alert and wide pulses sent by a neuron in the neuromorphic system shown in FIG. 1 in accordance with an embodiment of the invention.
Figure 4B:
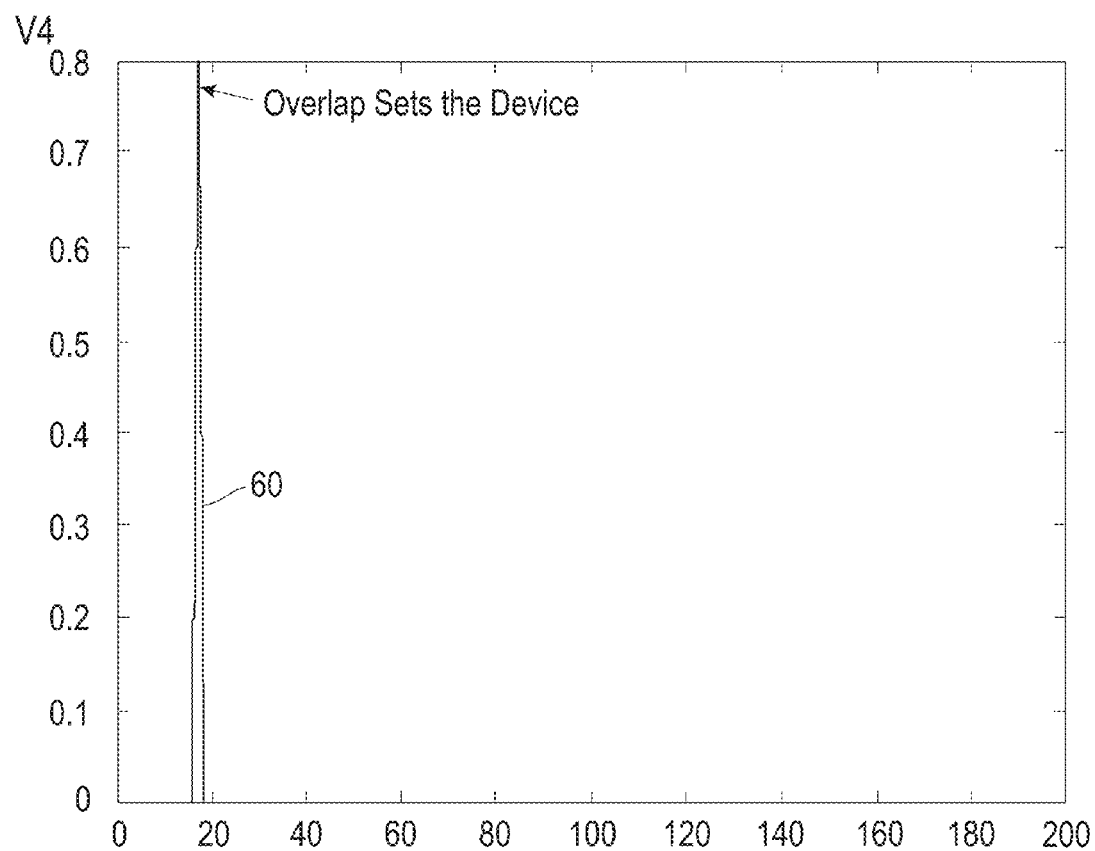
FIG. 4b shows a diagram of a rebound SET pulse sent by a neuron in the neuromorphic system shown in FIG. 1 in accordance with an embodiment of the invention.

During the SET operation, shown in FIGS. 4a and 4b, when neuron 20 fires it updates its D-STDP variable by a delta function, and lets it decay. Neuron 20 then sends a narrow alert pulse 56 into the dendrite 36. The alert pulse 50 may be a few ns long. The alert pulse 50 is received by upstream neurons 14 and 16. The alert pulse 56 is followed by a pause followed by a wider pulse 58, which may be about 1 μs long and have a magnitude of V3. The wider pulse 58 may also be referred to herein as a "gate" pulse. The wideness is to account for noise in delays. In an asynchronous fashion, with a probability proportional to their respective A-STDP variable, neurons 14-16 send rebound SET pulses with a pause and a narrow pulse 60 of a few ns in length, and with a voltage of magnitude V4. V4 is set such that V4-V3 will SET the associated variable state resistor 38 or 40.

The alert pulses 50 and 56 serves two purposes. They are a spike that the receiving (post-synaptic) neurons integrate to decide whether or not to fire. Every time that a neuron fires it charges its RC circuit to a maximum and then it decays. The alert pulses 50, 56 alert the other neurons that the firing neuron is going to be sending another wider pulse 52 or 58 at some later time. The time between the alert pulse and the wide pulse is fixed. The alert pulse triggers the receiving neurons to read the state of its RC circuit 48. The probability of the neuron sending a rebound pulse depends on the state of the RC circuit. The amount of decay, for example, is shown by the curve in FIG. 2. If the time between the alert pulse and the last firing is short, the voltage on the capacitor in the RC circuit will be high, and the receiving neuron will likely send a rebound pulse. If instead, the time between the alert pulse and the last firing is longer, the voltage on the capacitor will be lower and the receiving neuron will be less likely to send a rebound pulse. In another embodiment of the invention, the probability of the neuron sending a rebound pulse is determined using a magnetic tunneling junction device.

This embodiment is referred to as a binary embodiment because the neuron either sends a rebound pulse or it doesn't, with a probability that depends on the state of the RC circuit. In an analog embodiment, described in more detail below, the receiving neuron will always send a rebound pulse, but the strength of the rebound pulse will depend on the state of the RC circuit. The rebound pulse may also be referred to as a response pulse.

Figure 5:
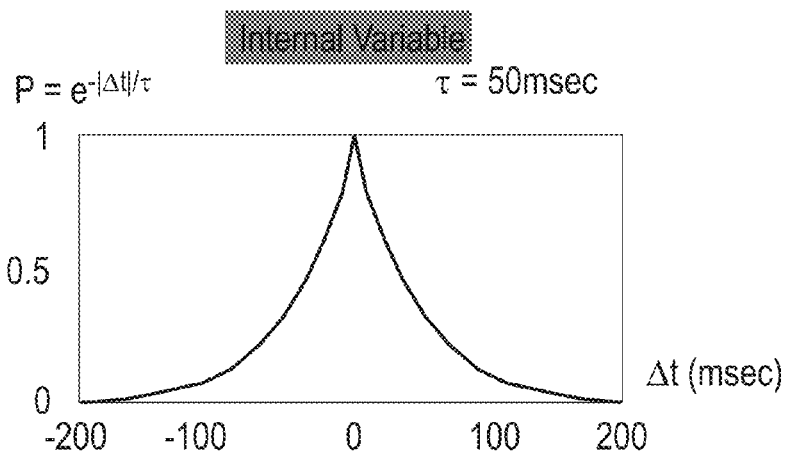
FIG. 5 shows a curve of an internal value controlled by the RC circuit shown in FIG. 1 in accordance with an embodiment of the invention.

FIG. 5 shows a graph of the above-discussed internal variable, A-STDP and D-STDP. The graph shows the state of the internal variable as a function of time in terms of Δt. The variable can also be considered a probability curve where the probability of the receiving neuron firing a rebound pulse varies from 1 to 0. In particular, $$P = e^{-|\Delta t|/\tau}$$

Where, the time constant τ is 50 ms, Δt is defined as the time of the post-synaptic neuron's last firing event minus the time of the pre-synaptic neuron's last firing event. Where the pre-synaptic neuron is connected to the synaptic element (variable state resistor) through an axon and the post-synaptic neuron is connected to the synaptic element through a dendrite. Thus, if a post-synaptic neuron fires before a pre-synaptic neuron Δt will be negative, and if a pre-synaptic neuron fires before the post-synaptic neuron Δt will be positive. For example, if the neuron connected to a synaptic element though the dendrite fires at time=0 then 50 msec later the neuron connected to the same synaptic element though the axon fires, then Δt=−50 msec for that synapse. Note that the firing neuron acts as both the pre- and post-synaptic neuron for its axonal and dendritic connections, respectively. Therefore, SET vs. RESET signals are determined by the mode of communication: a SET pulse is sent by the responding neuron's axon and a RESET pulse is sent by the responding neuron's dendrite.

Figure 6:
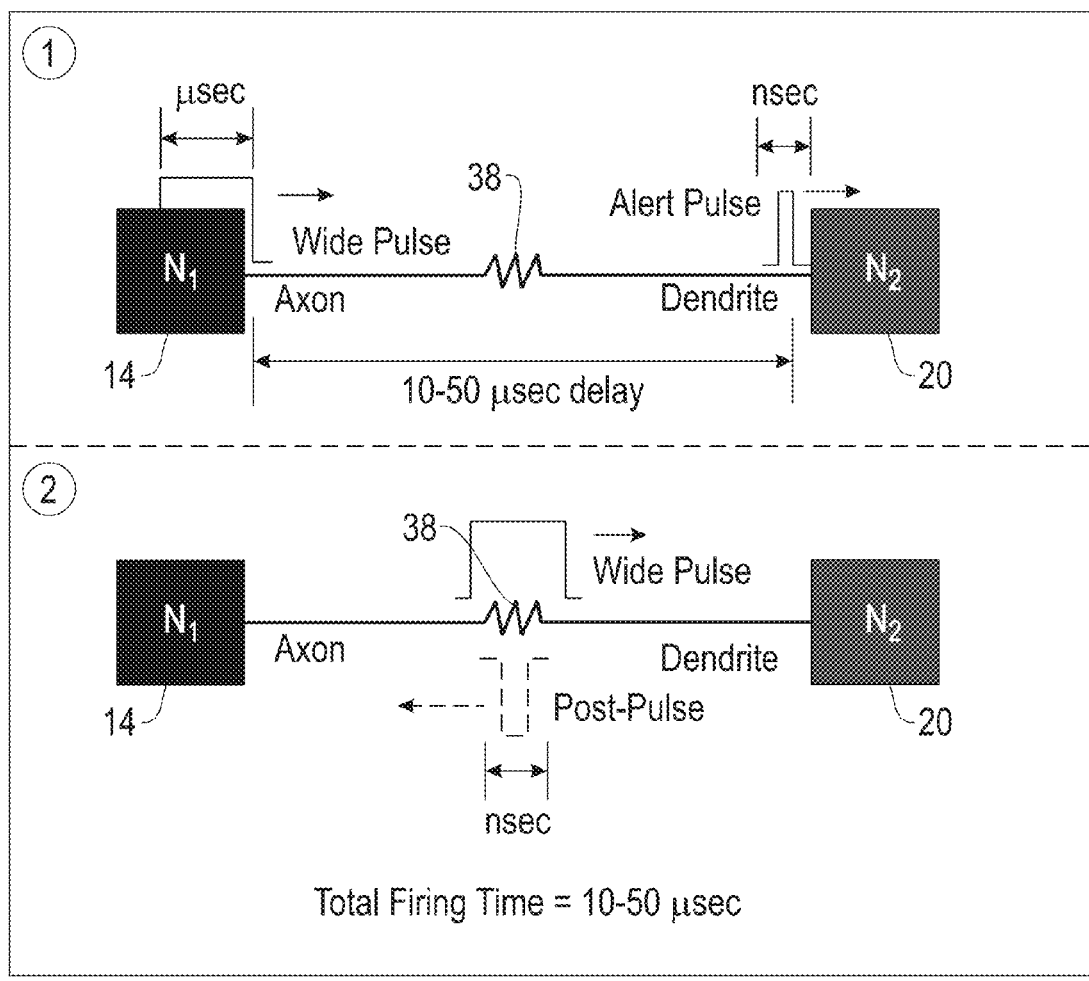
FIG. 6 shows a diagram of two stages of the firing of two neurons in the neuromorphic system shown in FIG. 1 in accordance with an embodiment of the invention.
Figure 7:
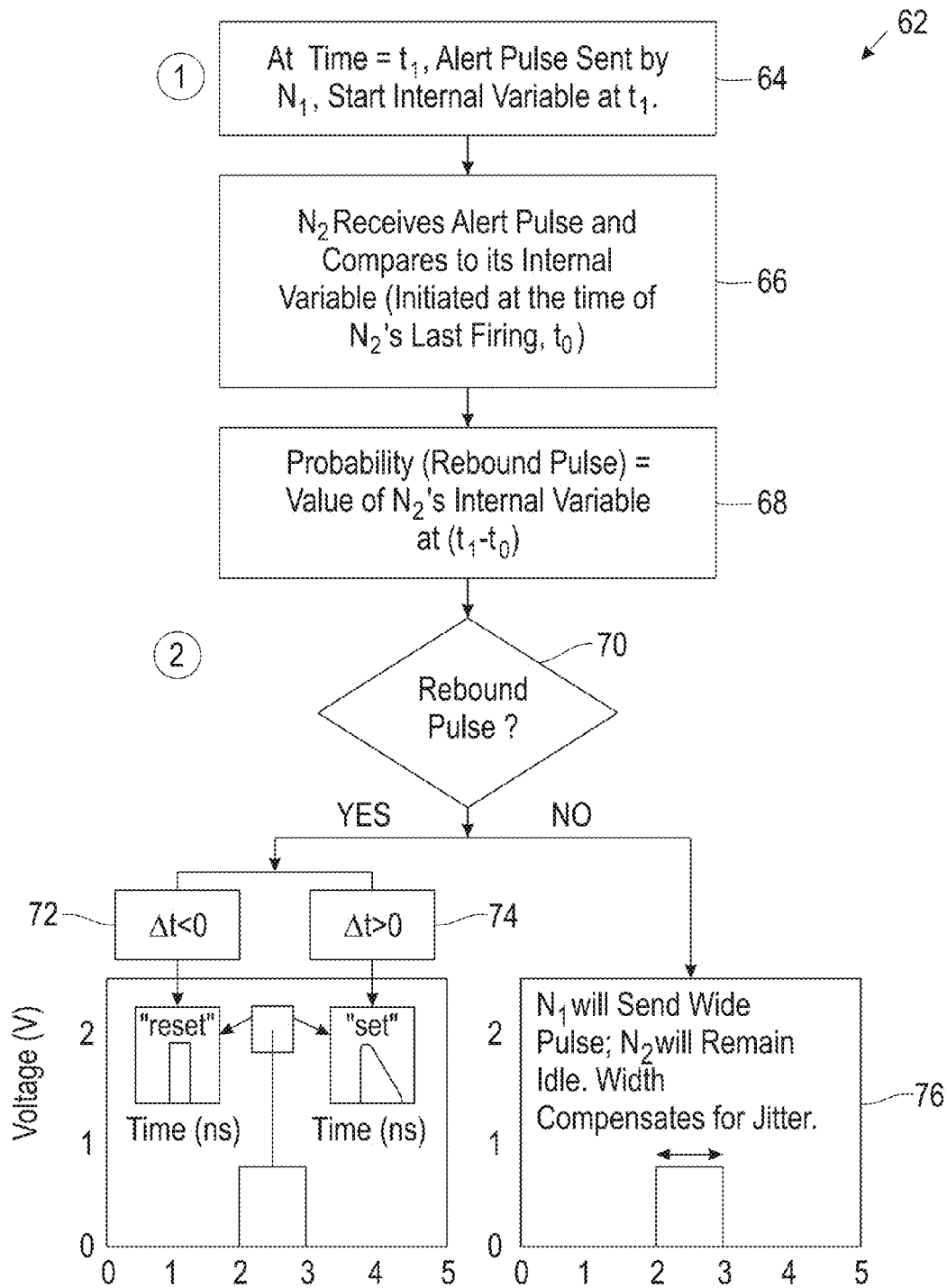
FIG. 7 shows a flow chart of the operation of the neuromorphic system shown in FIG. 1 in accordance with an embodiment of the invention.
Figure 8A:
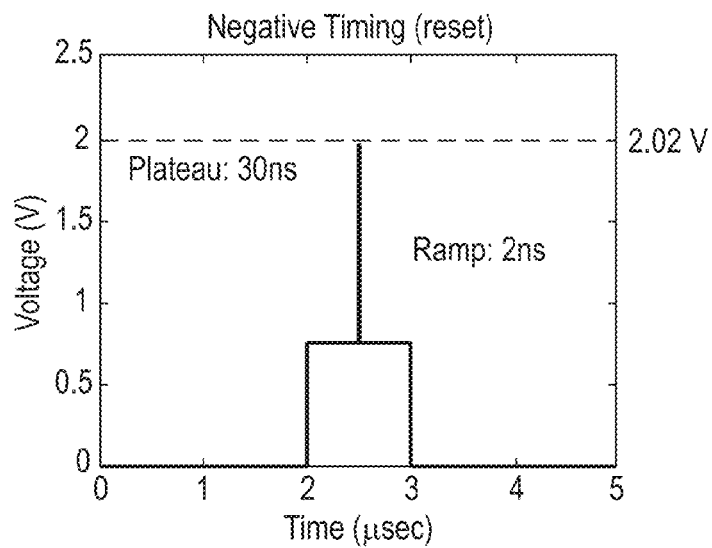
FIGS. 8a-8c shows rebound and wide pulses in the neuromorphic system shown in FIG. 1 in accordance with an embodiment of the invention.

FIG. 6 shows another diagram of the firing of two neurons, such as neurons 14 and 20 in FIG. 1 in accordance with an embodiment of the invention. FIG. 7 is a flowchart showing a method 62 of the operation of the system 10 shown in FIGS. 1 and 6 in accordance with this embodiment. The variable state resistor 38 connecting neurons 14 and 20 is also shown in FIG. 6. The method 62 begins at step 64 with the sending of an alert pulse by neuron 14. Neuron 14 also starts its internal variable at time=$t_i$. In step 66 neuron 20 receives the alert pulse and compares it to its internal variable, which was initiated at the time that neuron 20 last fired at time=$t_0$. At step 68, neuron 20 determines the probability of sending a rebound pulse back to neuron 14. This probability is proportional to the value of the internal variable of neuron 20 at time=$t_1-t_0$. In step 70, neuron 20 determines if it will send a rebound pulse or not based on the probability calculated in step 68. If neuron 20 will send a rebound pulse and Δt is negative, then at step 72, neuron 20 will send a RESET rebound pulse. This rebound pulse may have a waveform as shown in step 72, with a short ramp down. For example, the RESET pulse may be similar to the pulse shown in FIG. 8a.

Figure 8B:
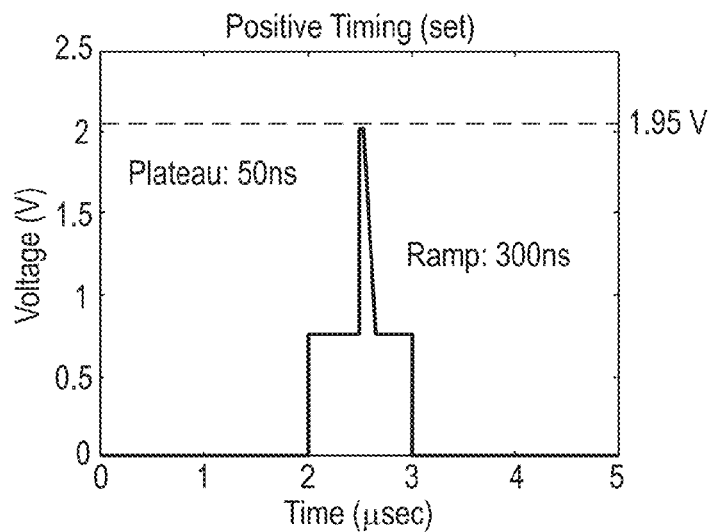
Figure 8C:
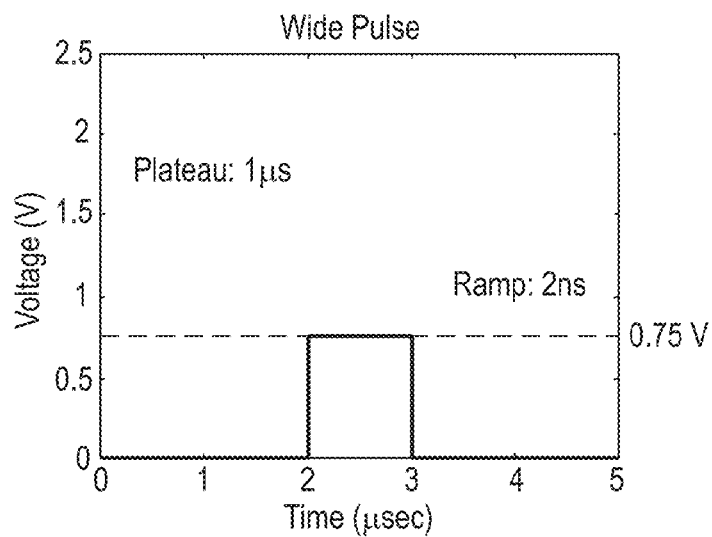

If neuron 20 will send a rebound pulse and Δt is positive, then at step 74, neuron 20 will send a SET rebound pulse. This rebound pulse may have a waveform as shown in step 74, with a fast ramp down. For example, the SET pulse may be similar to the pulse shown in FIG. 8b. Note that neuron 14 will always send a wide pulse after the alert pulse. This wide pulse is concomitant with the rebound pulse. In one embodiment, the rebound pulse is synchronous with the wide pulse due to clock synchronization. Hence, in FIGS. 6, 7 and 8, the wide pulse is shown overlapping in time with the rebound pulse.

If step 70 determined that neuron 20 would not send a rebound pulse, then neuron 14 will send a wide pulse, as shown at step 76. This wide pulse may be similar to the pulse shown in FIG. 8c.

Figure 9:
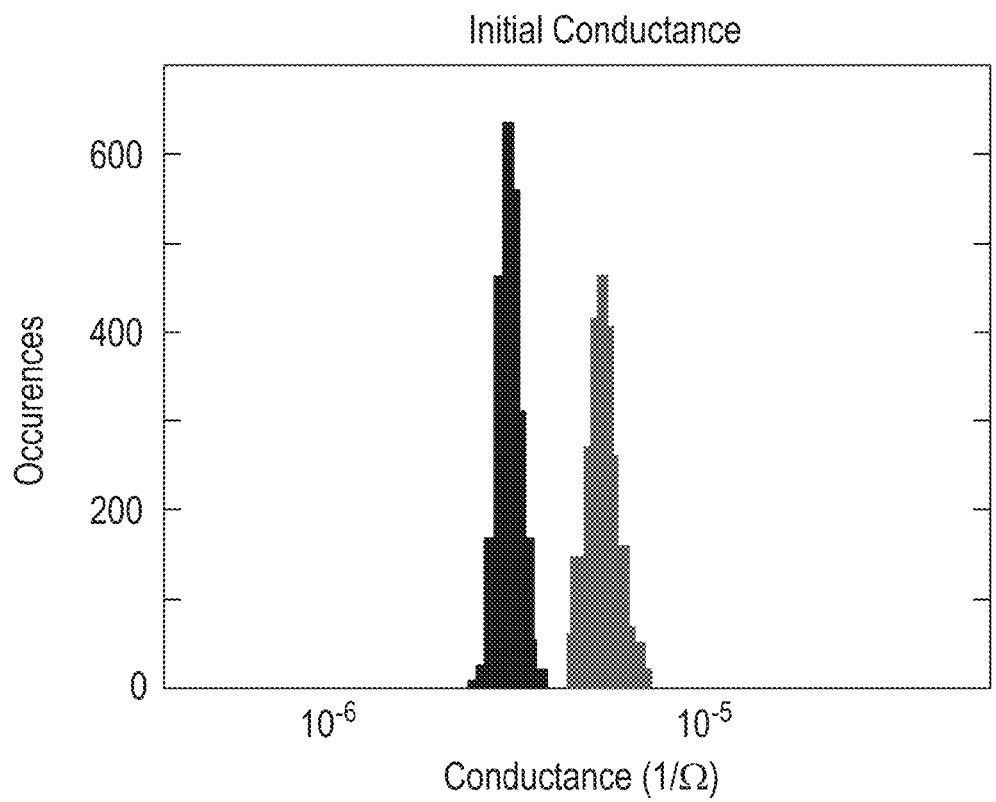
FIG. 9 shows a curve of initial conductance of a variable state resistor in the neuromorphic system shown in FIG. 1 in accordance with an embodiment of the invention.
Figure 10:
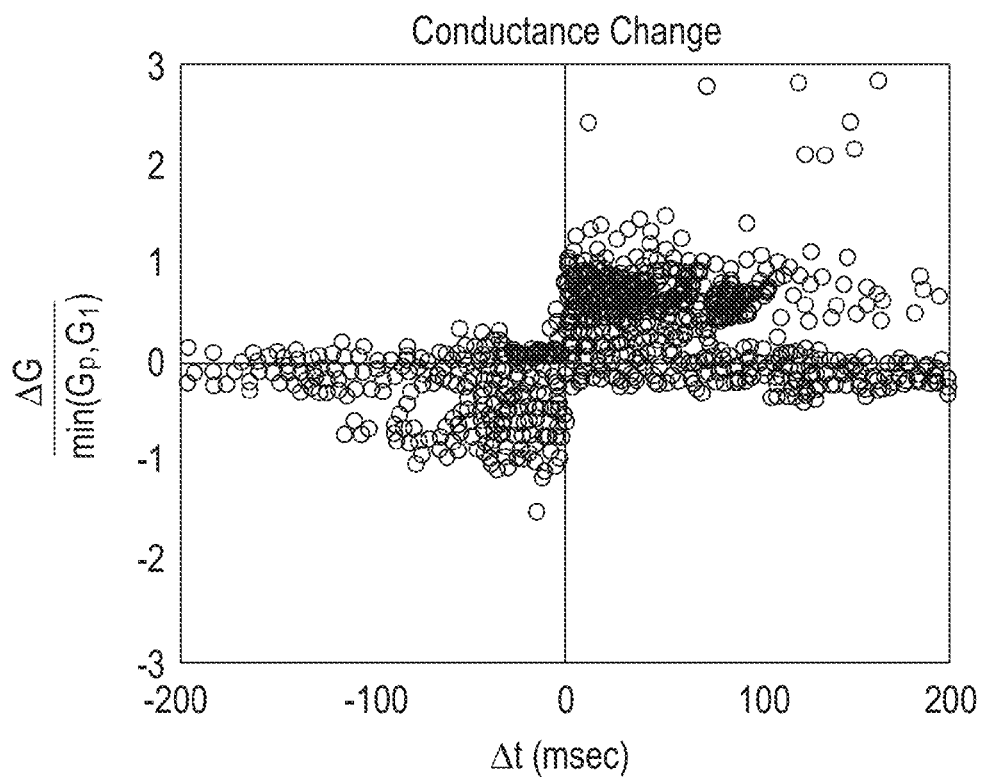
FIG. 10 shows a curve of initial conductance of a variable state resistor in the neuromorphic system shown in FIG. 1 in accordance with an embodiment of the invention.
Figure 11:
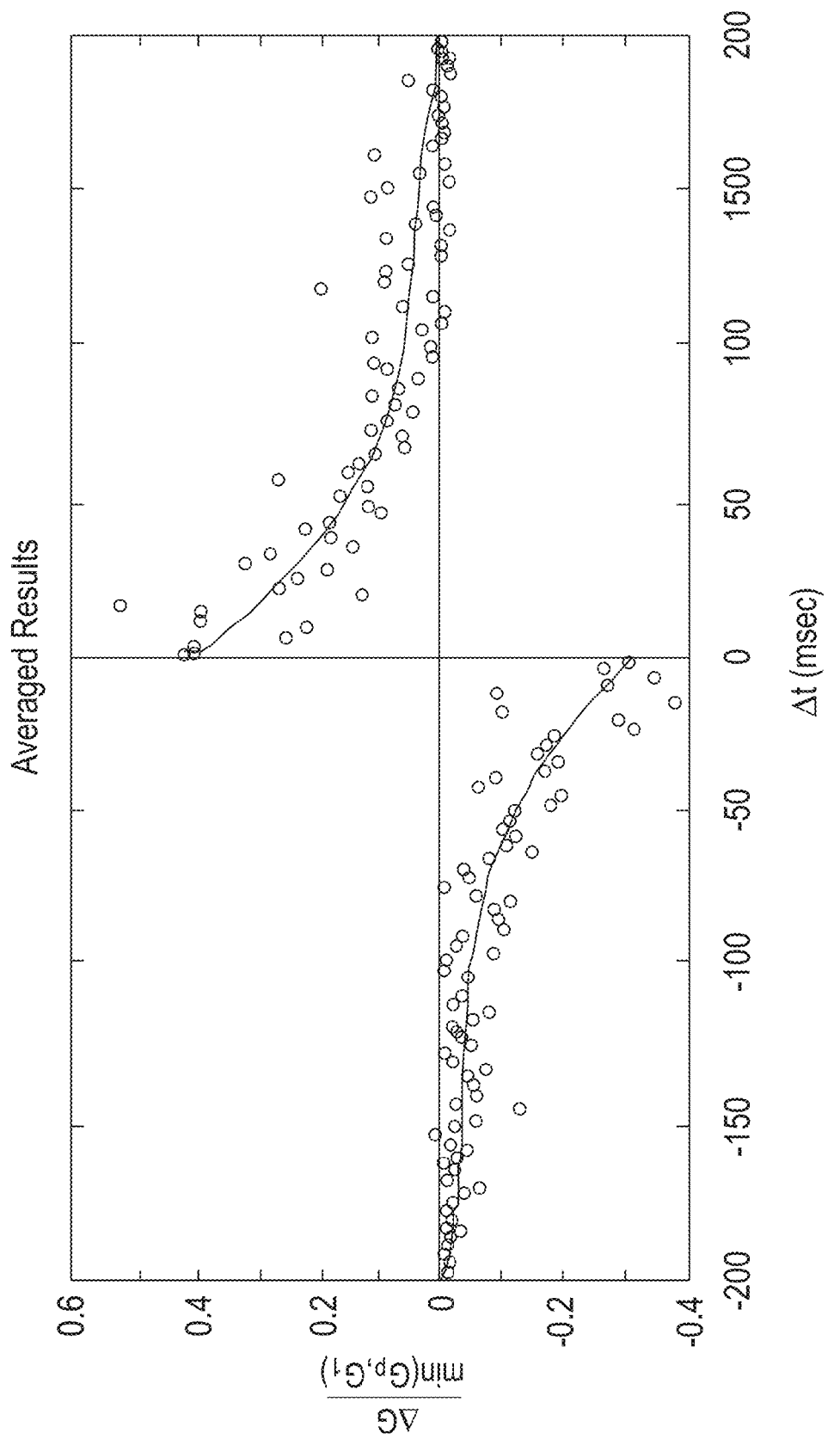
FIG. 11 shows a curve of averaged conductance of a variable state resistor in the neuromorphic system shown in FIG. 1 in accordance with an embodiment of the invention.

FIG. 9 is a histogram of the conductance values for a synaptic element (PCM in this case), and shows two distinct non-overlapping (binary) conductance distributions. FIG. 10 shows the change in conductance, normalized by the minimum between before and after resistances, as a function of the timing between neuronal firing. FIG. 11 is a temporal average of the data presented in FIG. 10. The change in conductance is a result of the combination the response pulse and the wide pulse. Hence, this change in conductance may be referred to herein as the "efficacy" of these pulses.

Figure 12:
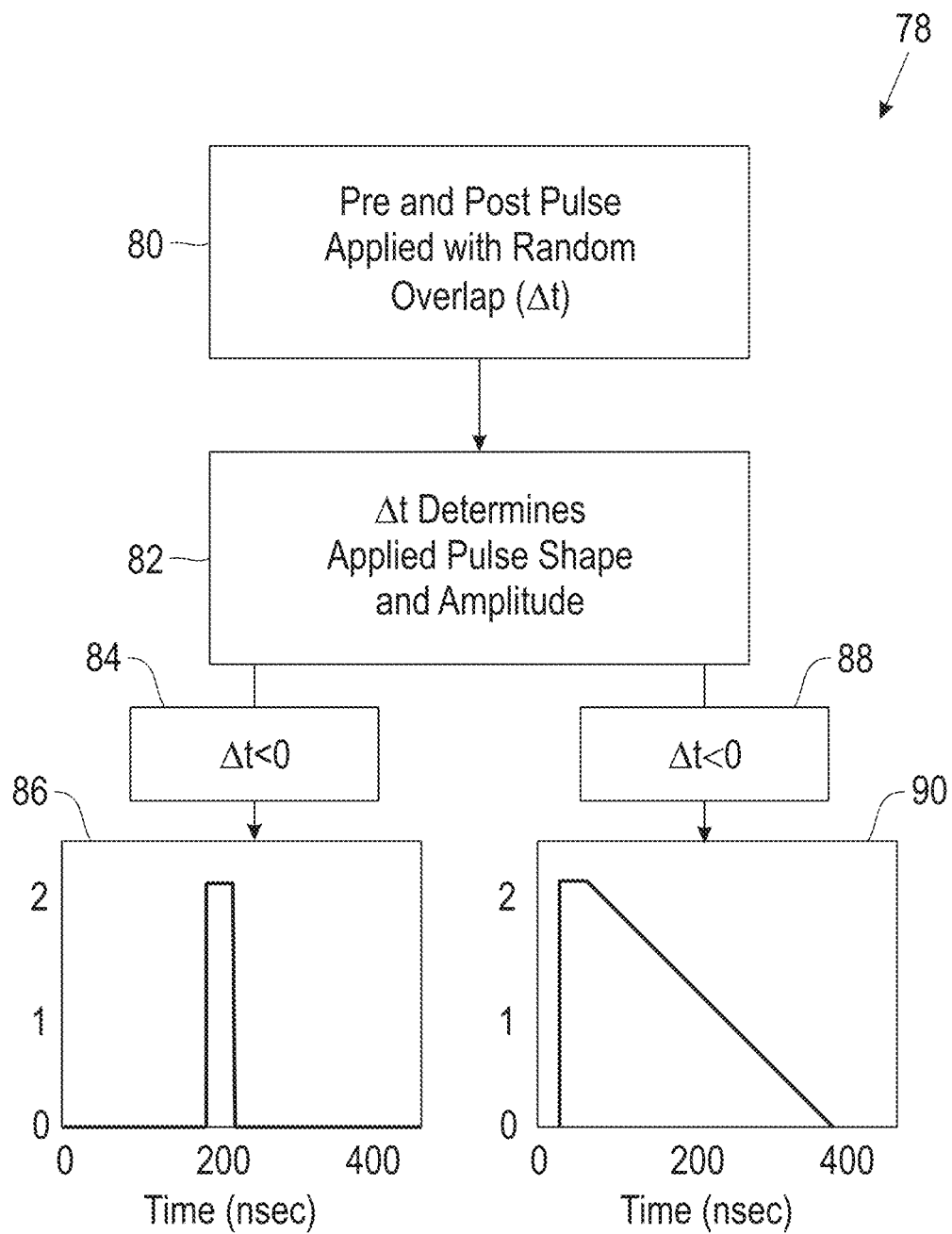
FIG. 12 shows a flow chart of the operation of the neuromorphic system shown in FIG. 1 in accordance with an embodiment of the invention.

FIG. 12 shows an alternative embodiment of the invention. This is the analog version briefly discussed above. This embodiment is one in which STDP is amplitude modulated instead of probability modulated as in main embodiment discussed above. In general, in this embodiment, the receiving neuron will always send a rebound pulse, and not only when a probability is high enough. However, the state of the RC circuit will determine the strength of the rebound pulse. In this embodiment, the system 10 may be similar to the cross-bar array as shown in FIG. 1. The flowchart in FIG. 12 shows a method 78 of amplitude modulated STDP in accordance with an embodiment of the invention. In step 80 the pre-synaptic and post-synaptic pulses are applied with random overlap ($\Delta t$). In step 82 the rebound pulse applied by N2 is determined by the value of $\Delta t$. In this embodiment, the voltage drop across a capacitor in the RC circuit may be converted directly into an amplitude for the response pulse. In step 84, if $\Delta t$ is negative, the wave form shown at 86 is sent to neuron N1. In step 88, if $\Delta t$ is positive, the waveform shown at 90 is sent to neuron N1.

Figure 13:
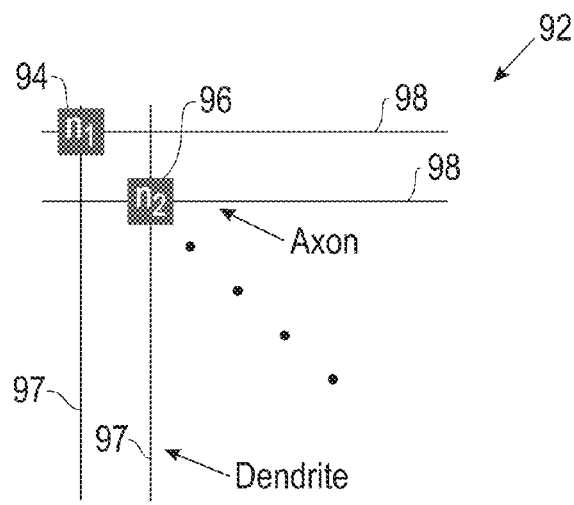
FIG. 13 shows a diagram of a neuromorphic system having an ultra-dense cross-bar array in accordance with an embodiment of the invention.
Figure 14:
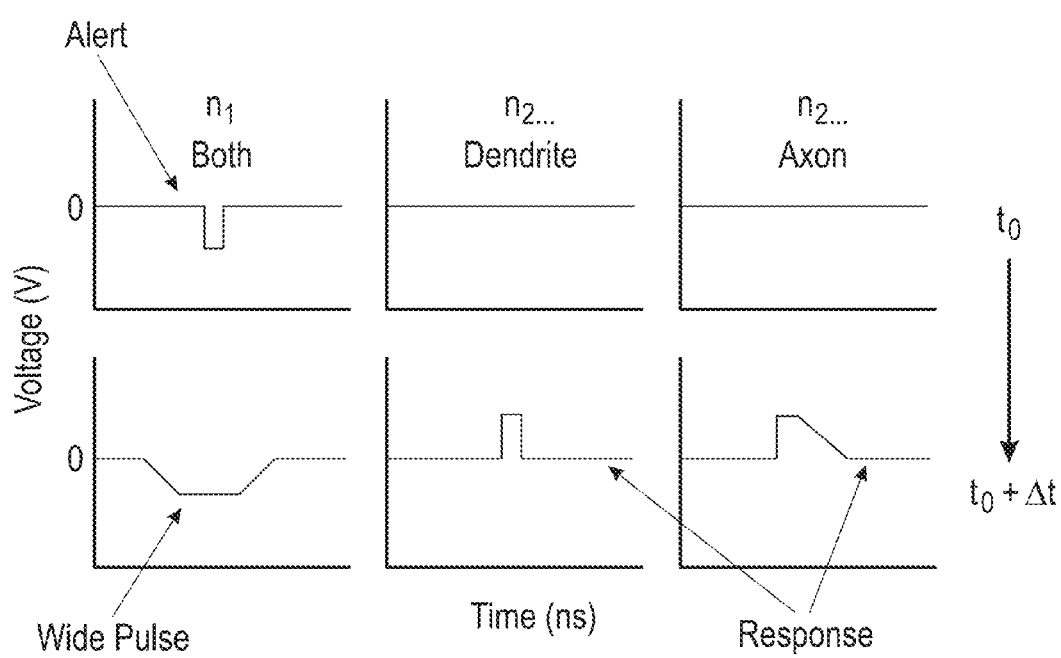
FIG. 14 shows a diagram of a set of pulses sent and received by two neurons in the neuromorphic system shown in FIG. 14 in accordance with an embodiment of the invention.

FIGS. 13 and 14 show a diagram illustrating the above-discussed principles according to an additional embodiment of the invention. In FIG. 13 a cross-bar array, such as the array 12 in FIG. 1, is shown. Two neurons 94 and 96 are each connected to horizontal axons 98 and vertical dendrites 97. FIG. 14 shows voltage pulses sent by these neurons at various times at the axons and dendrites. At time $t=t_0$, neuron 94 'fires,' therefore it sends an alert pulse to both its axon and to its dendrite. At the same time neuron 96 sends no pulse. At time $t=t_0+\Delta t$, neuron 94 sends a wide pulse, as discussed above. Also at this time, neuron 96 sends a RESET pulse to its dendritic connection 97. Neuron 96 will alternatively send a SET pulse to its axonal connection 98.

In another embodiment of the invention, the system can be configured such that when a neuron receives an alert pulse through an axon, it sends a response pulse capable of decreasing (instead of increasing) the conductance of the variable state resistor. Similarly, in this embodiment, when the neuron receives an alert pulse through a dendrite, it sends a response pulse capable of increasing (instead of decreasing) the conductance of the variable state resistor.

In another embodiment of the invention, the system can be configured such that the relative sizes of the "wide pulse" and the "post pulse" (also called the response pulse) as shown in FIG. 6 are reversed. Thus, the "post pulse" shown in FIG. 6 may be relatively wide as compared to the "wide pulse". Nevertheless, the combined affect of the two pulses on the variable state resistor may be the same as in the earlier described embodiment.

As can be seen from the above disclosure, embodiments of the invention provide an ultra-dense synapse cross-bar array implementing spike-timing dependent plasticity. As will be appreciated by one skilled in the art, aspects of the present invention may be embodied as a system or a method.

Figure 15:
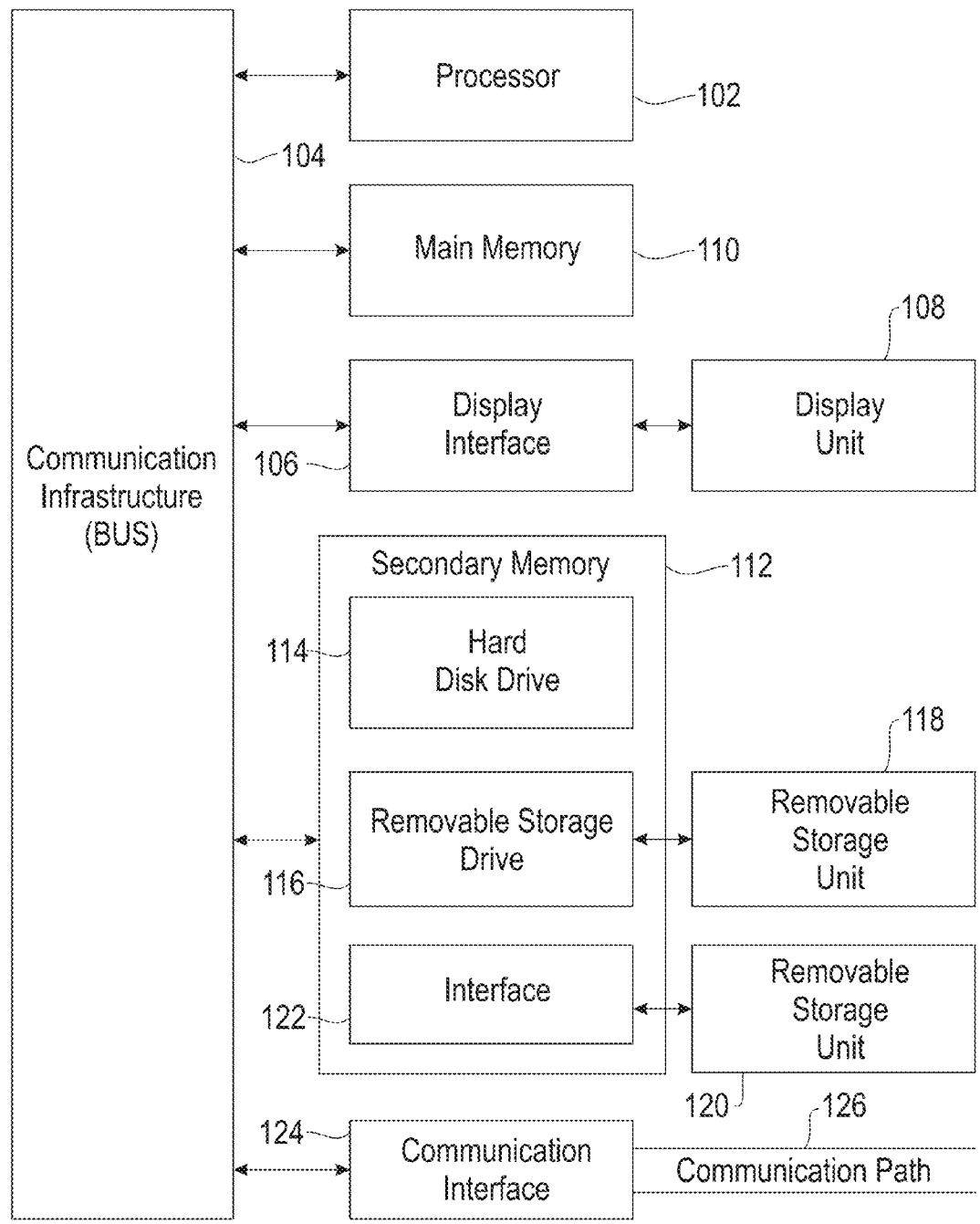
FIG. 15 shows a high level block diagram of an information processing system useful for implementing one embodiment of the present invention.

FIG. 15 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for producing spike-timing dependent plasticity, comprising:
    when an electronic neuron spikes, sending an alert pulse from the spiking electronic neuron to each electronic neuron connected to the spiking electronic neuron;
    when the spiking electronic neuron sends the alert pulse, sending a gate pulse from the spiking electronic neuron to each electronic neuron connected to the spiking electronic neuron; and
    when each electronic neuron receives the alert pulse, sending a response pulse from each electronic neuron receiving the alert pulse to the spiking electronic neuron;
    wherein the alert pulse notifies each electronic neuron connected to the spiking electronic neuron that the spiking electronic neuron is sending the gate pulse to said electronic neuron, and triggers said electronic neuron to read a state of said electronic neuron, wherein said electronic neuron sends a response pulse having an amplitude based on the state of said electronic neuron;
    wherein the response pulse is a function of time since a last spiking of the electronic neuron receiving the alert pulse; and
    wherein a combination of the gate pulse and response pulse is capable increasing or decreasing conductance of a variable state resistor.

2. The method of claim 1, further comprising:
    when the electronic neuron spikes, updating at least one internal variable of the spiking electronic neuron to an initial state, wherein said at least one internal variable is used to control a synaptic conductance of a variable state resistor.

3. The method of claim 1, wherein each electronic neuron receiving the alert pulse sends a response pulse, the response pulse is based on a probability that is a function of time elapsed since the electronic neuron receiving the alert pulse last spiked.

4. The method of claim 1, wherein:
    the efficacy of the response pulse is a function of time elapsed since the electronic neuron receiving the alert pulse last spiked.

5. The method of claim 1, wherein sending the response pulse further comprises:
    if an electronic neuron receives a retrograde alert pulse, sending a response pulse from the electronic neuron receiving the retrograde alert pulse, wherein the response pulse is configured to increase conductance of the variable state resistor; and
    if an electronic neuron receives a forward alert pulse, sending a response pulse from the electronic neuron receiving the forward alert pulse, wherein the response pulse is configured to decrease conductance of the variable state resistor.

6. The method of claim 1, wherein said sending a response pulse further comprises:
    if an electronic neuron receives a retrograde alert pulse, sending a response pulse from the electronic neuron receiving the retrograde alert pulse, wherein the response pulse is configured to decrease conductance of the variable state resistor; and
    if an electronic neuron receives a forward alert pulse, sending a response pulse from the electronic neuron receiving the forward alert pulse, wherein the response pulse is configured to increase conductance of the variable state resistor.

7. The method of claim 1, wherein the gate pulse is concomitant with the response pulse and conductance of the variable state resistor varies based on a combination of the gate pulse and the response pulse.

8. The method of claim 1, wherein the variable state resistor is a resistor selected from the group consisting of a phase change material, a metal oxide, a magnetic tunnel junction, and an organic thin film.

9. The method of claim 1, wherein the variable state resistor is a resistor selected from the group consisting of a floating gate field effect transistor and a static random access memory.

10. The method of claim 1, wherein the gate pulse is longer than the response pulse.

11. The method of claim 1, wherein the response pulse is longer than the gate pulse.

12. The method of claim 1, wherein the response pulse is synchronous in time with said gate pulse using clock synchronization.

13. The method of claim 4, wherein:
    a state of an electronic neuron is maintained in a resistor-capacitor circuit corresponding to said electronic neuron; and
    each electronic neuron is coupled to a cross-bar array.

14. The method of claim 2, wherein the internal variable has a value which varies from an initial state defined at a time of a last spiking of an electronic neuron to a value that is a function of time elapsed since the last spiking of the electronic neuron.

15. The method of claim 3, wherein the value of the internal variable is dependent on a voltage across a capacitor.

16. The method of claim 3, wherein determining the value of the internal variable does not erase the value of the internal variable.

17. The method of claim 3, wherein the value of the internal variable changes as a function of time according to a function selected from the group consisting of a linear function, an exponential function, and a polynomial function.

18. The method of claim 3, wherein the probability is determined using a magnetic tunneling junction.

19. The method of claim 13, wherein the cross-bar array comprises:
an ultra-dense cross-bar array.

20. The method of claim 15, wherein a spiking neuron charges the capacitor to an initial voltage, further wherein the voltage across the capacitor decays through a resistor as a function of time.

21. A method for tracking time elapsed since a previous spiking event within an electronic neuron, comprising:
maintaining at least one internal variable for an electronic neuron, wherein the internal variable has a value which varies from an initial state defined at a time of a last firing of the electronic neuron to a value that is a function of time: and
the electronic neuron receiving an alert pulse from a spiking electronic neuron, wherein said alert pulse triggers the electronic neuron to read the internal variable to obtain a state of the electronic neuron, and wherein the electronic neuron sends a response pulse having an amplitude based on the state of the electronic neuron.

22. A system for producing spike-timing dependent plasticity, comprising:
a processor;
a plurality of electronic neurons, wherein each electronic neuron is configured to:
send an alert pulse to each connected electronic neuron when the electronic neuron spikes,
send a gate pulse from the spiking electronic neuron to each connected electronic neuron when the spiking electronic neuron sends the alert pulse, and
send a response pulse from each electronic neuron receiving the alert pulse to the spiking electronic neuron; and
a cross-bar array coupled to the plurality of electronic neurons and configured to interconnect the plurality of electronic neurons;
wherein an alert pulse from a spiking electronic neuron notifies each connected electronic neuron that said spiking electronic neuron is sending a gate pulse to said connected electronic neuron, and triggers said electronic neuron to read a state of said electronic neuron, wherein said electronic neuron sends a response pulse having an amplitude based on the state of said electronic neuron;
wherein the cross-bar array comprises a plurality of variable state resistors;
wherein each variable state resistor is at a cross-point junction, the cross-point junction is coupled between two electronic neurons; and
wherein each variable state resistor is configured to increase or decrease conductance as a function of time since a last spiking of the electronic neuron receiving the alert pulse.

23. The system of claim 22, wherein each electronic neuron is further configured to update at least one internal variable of the spiking electronic neuron to an initial state when the electronic neuron spikes, wherein said at least one internal variable is used to control a synaptic conductance of a variable state resistor.

24. The system of claim 22, wherein each electronic neuron is further configured to send a response pulse when the electronic neuron receives the alert pulse, wherein the response pulse is based on a probability that is a function of time elapsed since the electronic neuron receiving the alert pulse last spiked.

25. The system of claim 22, wherein—
efficacy of the response pulse is a function of time elapsed since the electronic neuron receiving the alert pulse last spiked.

26. The system according to claim 22,
wherein the gate pulse is concomitant with the response pulse and conductance of the variable state resistor varies based on a combination of the gate pulse and the response pulse.

27. The system of claim 23, wherein the internal variable has a value which varies from an initial state defined at a time of a last spiking of an electronic neuron to a value that is a function of time elapsed since the last spiking of the electronic neuron.

* * * * *